(12) United States Patent
Magnusson et al.

(10) Patent No.: US 10,520,016 B2
(45) Date of Patent: Dec. 31, 2019

(54) BEARING ROLLER ELEMENTS AND ASSEMBLY

(71) Applicant: Taurus Technologies Group, Inc., Grimsby (CA)

(72) Inventors: Stefan Magnusson, Grimsby (CA); Marta Magnusson, Grimsby (CA); Maxine Magnusson, Grimsby (CA)

(73) Assignee: Taurus Technologies Group, Inc., Schaumburg, IL (US)

( * ) Notice: Subject to any disclaimer, the term of this patent is extended or adjusted under 35 U.S.C. 154(b) by 0 days.

(21) Appl. No.: 15/809,713

(22) Filed: Nov. 10, 2017

(65) Prior Publication Data

US 2019/0145459 A1   May 16, 2019

(51) Int. Cl.

| | |
|---|---|
| *F16C 19/26* | (2006.01) |
| *F16C 32/04* | (2006.01) |
| *F16C 33/52* | (2006.01) |
| *F16C 33/66* | (2006.01) |
| *G01P 3/42* | (2006.01) |
| *F16C 37/00* | (2006.01) |

(52) U.S. Cl.
CPC .......... *F16C 19/26* (2013.01); *F16C 32/0444* (2013.01); *F16C 33/523* (2013.01); *F16C 33/6681* (2013.01); *F16C 37/007* (2013.01); *G01P 3/42* (2013.01); *F16C 2300/02* (2013.01)

(58) Field of Classification Search
CPC .. F16C 19/26; F16C 32/0444; F16C 32/0482; F16C 32/0426; F16C 33/6681; F16C 37/005; F16C 37/007; F16C 39/066; F16C 33/523; G01P 3/46; G01P 3/52; G01P 3/42; H02K 7/09

USPC ............ 384/418, 548, 446; 324/174, 207.17, 324/207.25; 310/90.5, 154.32, 154.36

See application file for complete search history.

(56) References Cited

U.S. PATENT DOCUMENTS

| | | | |
|---|---|---|---|
| 3,031,802 A | * | 5/1962 | Leliaert ..................... B24C 3/14 277/355 |
| 3,748,004 A | | 7/1973 | McKee |
| 3,977,739 A | * | 8/1976 | Moskowitz ......... F16C 33/6644 384/446 |

(Continued)

FOREIGN PATENT DOCUMENTS

| | | | | |
|---|---|---|---|---|
| DE | 102011080796 A1 | * | 2/2013 | ............ F16C 25/086 |
| EP | 2865911 A1 | * | 4/2015 | .......... F16C 32/0406 |

(Continued)

*Primary Examiner* — Marcus Charles
(74) *Attorney, Agent, or Firm* — Whipple Legal Services; Marc J. Whipple

(57) ABSTRACT

Improved bearing roller elements are disclosed. Vanes are added to a ring-roller type element which allow fluids to flow through a bearing assembly in a controlled manner. The fluids can then provide convection cooling. The vaned ring-roller elements allow the creation of a pump, either as part of the bearing assembly's cooling system or as a dedicated device. The use of magnetic spokes in ring-roller type elements which can be used with or without the vanes which allows them to be driven by an electromagnetic field is also disclosed, as is the use of such magnetic elements in the bearing roller elements to allow electromagnetic braking and/or regenerative braking. A bearing assembly incorporating the roller elements in a ring configuration and using pre-load to produce additional benefits is also disclosed.

12 Claims, 6 Drawing Sheets

(56) References Cited

U.S. PATENT DOCUMENTS

| | | | | |
|---|---|---|---|---|
| 4,000,929 | A * | 1/1977 | Studer | F16C 32/048 310/90.5 |
| 5,345,128 | A * | 9/1994 | Pinkerton | F16C 32/0408 310/90.5 |
| 6,114,788 | A * | 9/2000 | Vuillemin (Muller) | F16C 32/0493 310/156.35 |
| 6,703,736 | B2 * | 3/2004 | Wang | H02K 7/09 310/67 R |
| 6,921,997 | B2 * | 7/2005 | Chen | F16C 32/0451 310/166 |
| 8,896,174 | B2 * | 11/2014 | Choi | F16C 32/047 310/68 B |
| 2003/0117031 | A1 * | 6/2003 | Wang | H02K 7/09 310/90.5 |
| 2004/0256935 | A1 * | 12/2004 | Kenny | F16C 32/0465 310/90.5 |
| 2005/0174106 | A1 * | 8/2005 | Inoue | F16C 19/184 324/164 |
| 2010/0176604 | A1 * | 7/2010 | Bravo | B60Q 1/326 290/1 R |
| 2014/0252900 | A1 * | 9/2014 | Mandes | H02K 21/36 310/154.29 |
| 2015/0110427 | A1 * | 4/2015 | Berens | F16C 33/588 384/446 |
| 2015/0122930 | A1 * | 5/2015 | Ohara | F16C 33/765 242/321 |

FOREIGN PATENT DOCUMENTS

| | | | |
|---|---|---|---|
| JP | 2001050261 A | * | 2/2001 |
| JP | 2003097582 A | * | 4/2003 |

* cited by examiner

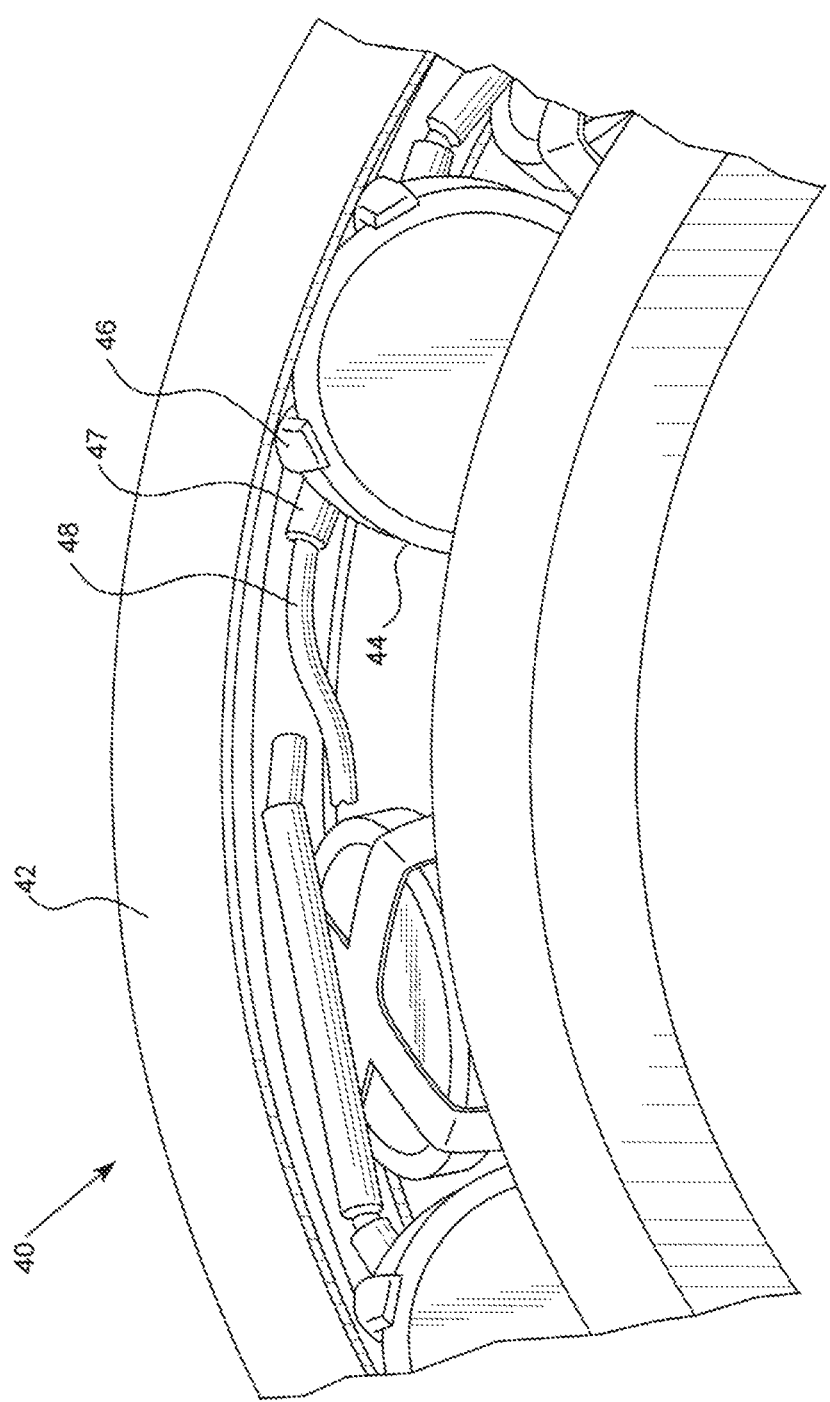

BEARING ROLLER ELEMENTS AND ASSEMBLY

This invention relates to bearing roller elements and assembly. Specifically, vanes may be added to bearing elements, allowing fluid to flow through the bearing assembly in a controlled manner for lubrication, cooling, or any other desirable purpose. Additionally, magnetic elements may be added to the bearing elements which allow electromagnetic drivers, electromagnetic braking, and/or regenerative braking of the bearing assembly. The improvements may be used singly or in combination. A bearing assembly incorporating the roller elements is also described.

INCLUSION BY REFERENCE

Previously filed United States of America Patent Application titled IMPROVED BEARING ASSEMBLY with an application filing date of Sep. 5, 2017, in the United States Patent and Trademark Office, application Ser. No. 15/695,921, said application made by the same applicant, is hereby incorporated herein by reference.

BACKGROUND OF THE INVENTION

The present invention relates to an improved roller element for bearing assemblies. Bearings, generally, are simply surfaces or interfaces where moving parts of a device interface with each other in a non-engaged fashion. (I.E. gears or rack-and-pinion systems are not bearings for purposes of this context.) Historically, these surfaces have either slid against each other, or been provided with roller elements which minimize sliding friction and wear. The standard example of the latter is the ball bearing, which incorporates one or more spherical roller elements ("balls") which are captive between two rotating members of the device. Rather than have a direct planar or linear interface between the rotating members, the balls bear any mechanical load and allow the rotating members to spin freely against each other.

In U.S. patent application Ser. No. 15/695,921 (see DESCRIPTION OF THE PREFERRED EMBODIMENT) an improved bearing assembly was disclosed which addresses many of the shortcomings of traditional ball bearings. However, the improved bearing assembly could still benefit from improved roller elements. An improved roller element which enables such improved bearing assembly to function more efficiently and/or perform additional functions would be a useful invention.

Bearings must often be actively cooled, especially in high-load and/or high-speed applications, as no matter how precisely they are made, rolling friction will still generate heat. Moving a fluid—either a gas, such as atmospheric air, or a liquid, such as water—around and/or through a bearing is a good way to carry away heat via convection, but traditional bearings do not allow an efficient method of fluid cooling. (For purposes of this application "fluid" should be understood to include both gases and liquids unless otherwise specified.) An improved roller element which allows a more effective fluid flow for convection cooling would be a useful invention.

Similarly, bearings must often be lubricated. For the same reasons as set forth in the preceding paragraph, creating an optimal flow of lubricant through a traditional bearing assembly can be difficult. An improved roller element which allows a more optimal flow of lubricant through a bearing assembly would be a useful invention.

Bearings themselves have historically comprised passive assemblies which do not contribute to the motivation of the moving parts the bearing assembly allows to move. If a bearing assembly could itself impart energy to the moving parts, it could allow the creation of more compact and less complicated mechanical devices. An improved roller element which allows the bearing assembly to impart energy to a larger mechanical device would be a useful invention.

Likewise, a bearing assembly which could capture energy for later use when the moving parts the bearing assembly allows to move are slowed or stopped would be economically and environmentally beneficial. An improved roller element which allows the capture of energy when a bearing assembly is slowed or stopped would be a useful invention.

Mechanical devices which incorporate rotating movement are usually stopped either by applying some form of braking friction (e.g. automotive disc brakes, which apply friction to a disc affixed to the wheels to convert motion to heat and slow and/or stop the wheel) or by simply removing the source of motive energy and allowing friction to bring the rotation to a halt (e.g. simply putting an automotive transmission in neutral and allowing the vehicle to coast to a stop.) In many applications, neither of these methods are optimal: the first creates large amounts of heat which must be dispersed and causes mechanical wear, and the second is slow and inconsistent. An improved roller element which would allow mechanical devices to be stopped quickly, reliably and efficiently while minimizing mechanical wear would be a useful invention.

The present invention addresses these concerns.

SUMMARY OF THE INVENTION

Among the many objectives of the present invention is the provision of an improved roller element which allows fluids to flow through bearing assemblies for cooling purposes.

Another objective of the present invention is the provision of an improved roller element which allows liquids to flow through bearing assemblies for lubrication purposes.

Another objective of the present invention is the provision of an improved roller element which forces fluids to flow through bearing assemblies for the purpose of actively pumping the fluids.

Another objective of the present invention is the provision of an improved roller element which allows the use of electromagnetic force to drive a bearing assembly.

Yet another objective of the present invention is the provision of an improved roller element which allows the use of electromagnetic braking and/or regenerative braking on a bearing assembly.

Other objectives and advantages of the present invention will become apparent to those of ordinary skill in the art upon review of the disclosure hereof.

BRIEF DESCRIPTION OF THE DRAWINGS

FIG. 3 depicts a bearing assembly incorporating a cage as referenced in the specification.

DESCRIPTION OF THE PREFERRED EMBODIMENTS

Figure 1A:
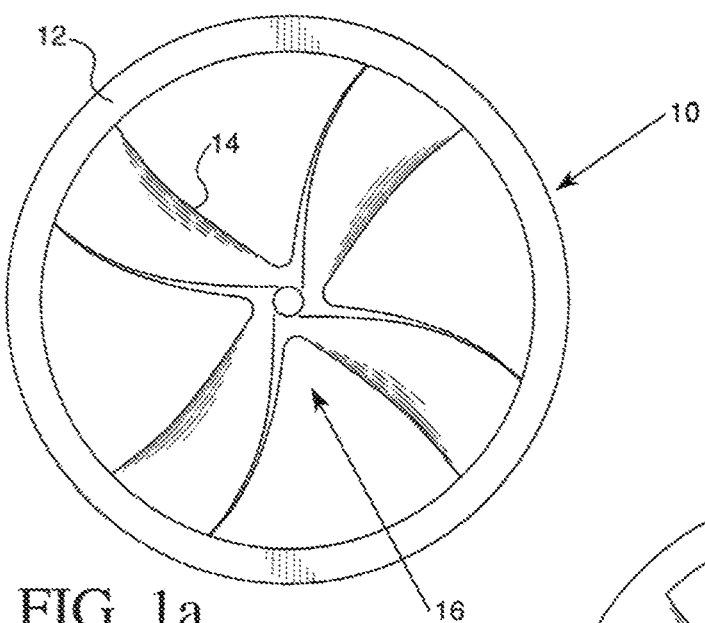
FIG. 1a depicts a side view of a first improved roller element.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

Though applicable to many applications, the improved roller elements disclosed herein are particularly useful when incorporated into an improved bearing assembly like the one disclosed in the previously filed United States of America Patent Application titled IMPROVED BEARING ASSEMBLY with an application filing date of Sep. 5, 2017, in the United States Patent and Trademark Office, application Ser. No. 15/695,921, said application made by the same applicant, with the entirety of said application being incorporated herein by reference to provide continuity of disclosure. The improved bearing assembly disclosed in that application will be referred to herein as the "IBA" and that application as the "IBA Application."

Figure 1B:
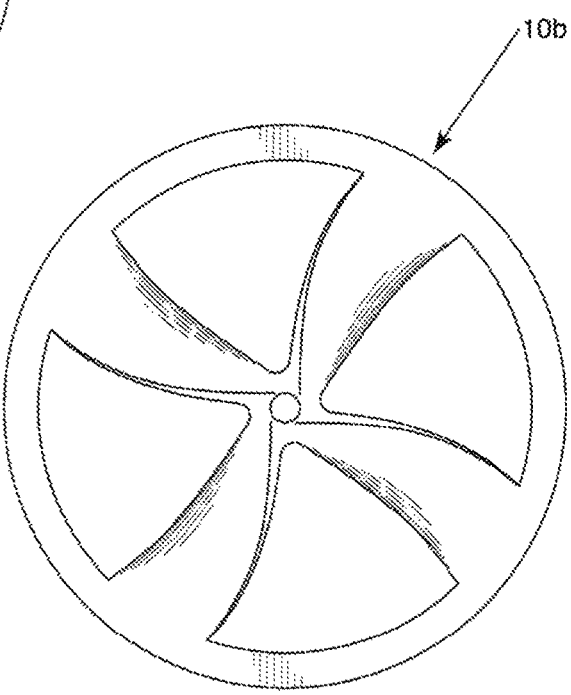
FIG. 1b depicts a side view of an alternate embodiment of the first improved roller element.
Figure 1C:
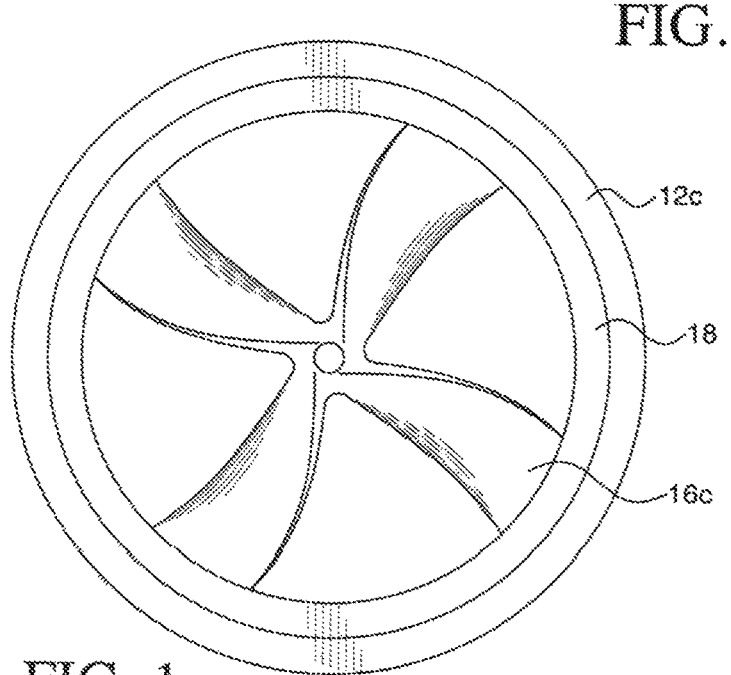
FIG. 1c depicts a side view of another alternate embodiment of the first improved roller element.

By referring to FIGS. 1a through 1c, the first embodiment of the improved roller element can be easily understood. In FIG. 1a, a vaned ring roller 10 is shown which comprises ring member 12 and axial vane member 16. Axial vane member 16 is comprised of at least two vanes such as vane 14. Collectively, the vanes define inter-vane spaces, which exist between each of the vanes of axial vane member 16. Axial vane member 16 is geometrically configured such that any fluid through which axial vane member 16 moves will be impelled to flow through the inter-vane spaces along the axis of rotation of vaned ring roller 10. Vaned ring roller 10 becomes, by analogy, a propeller/impeller blade which pushes the fluid through the inter-vane spaces and thus through the bearing assembly (not shown: see IBA Application or FIG. 2c for examples.)

It should be noted that the IBA Application teaches a new form of "cage," or subassembly used to maintain spacing of ring rollers in the IBA. If a cage is used, it is strongly preferred to configure the individual cage elements (or, if a single piece, those parts of the cage which could interfere with the flow generated by the vaned ring rollers) such that the flow generated by the vaned ring rollers of this first embodiment is minimally impeded by the cage. See FIG. 3 and its description below for an example.

It is required that axial vane member 16 be shaped so that there is a significant differential pressure generated which makes the fluid through which vaned ring roller 10 moves have a tendency to flow in a fixed direction. (In the example shown, the fluid would be impelled to move toward the viewer orthogonal to the plane of the figure.) This shape is referred to as a "pitch." It is required that the bearing assembly be configured such that the fluid through which vaned ring roller 10 moves can circulate freely enough that back-pressure does not cause significant resistance to the motion of vaned ring roller 10 or the bearing assembly as a whole. It is strongly preferred, but not required, that the bearing assembly be configured such that the fluid through which vaned ring roller 10 moves can circulate either through a closed system with enough fluid that the amount of fluid in the raceway of the bearing assembly is a small proportion of the total amount of fluid in the system, or through a system open to a relatively large source of the fluid, such as the Earth's atmosphere, a natural body of water such as an ocean, or a container of the fluid whose volume is at least ten times larger than the volume of the raceway and in which the entire raceway can be submerged. The area of the system from which fluid flows into the raceway is the "intake area," and the area of the system from which fluid flows out of the raceway is the "outflow area." It is required that fluid be able to flow continuously from the intake area, through the raceway, and into the outflow area during normal operation. Impeding this flow from or to these areas will cause hydrostatic or vacuum locking and reduce the efficiency of the bearing assembly as well as reducing the benefit provided by the invention.

FIG. 1b shows an alternate embodiment of the vaned ring roller, here vaned ring roller 10b. The ring member and the axial vane member have been formed as a single element. This has the advantage of simplicity and less complex manufacturing procedures, but means that if either the axial vanes or the ring are damaged, neither element can be replaced individually.

FIG. 1c shows a second alternate embodiment of vaned ring roller 10. Here axial vane member 16c engages with inner ring 18, which in turn engages with ring 12c. This allows the assembly of axial vane member 16c and inner ring 18 to be easily inserted into or removed from ring 12c, and provides additional reinforcement and/or elasticity to vaned ring roller 10. This also allows efficient replacement of only one component of vaned ring roller 10 for repair or maintenance purposes.

It is optional, but strongly preferred, that the outer circumference of vaned ring roller 10 be larger than the distance between the surfaces of the raceways such that vaned ring roller 10 is under "pre-load" as that term is used in the IBA Application. (See description starting at Line 5, Page 14 of the IBA Application.)

It is optional to include some means of slowing the circulation of the fluid or forcing the fluid to flow in the direction opposite to which it would otherwise be impelled by vaned ring roller 10. This would have the effect of braking vaned ring roller 10, and thus the bearing assembly, without the use of conventional direct frictional braking techniques. This can be as simple as a means of blocking the circulatory system of the fluid (e.g. by closing a valve) and preventing its circulation, which would cause hydrostatic or vacuum locking of the fluid circulation and increase resistance to the fluid flow. Alternatively, it can be a pump or other mechanical device which forces the fluid to flow in the direction opposite the direction to which it would otherwise be impelled by vaned ring roller 10.

In an alternate usage for this embodiment of the invention, the principle that the rotation of vaned ring roller 10 will cause fluid to be impelled to flow through the bearing assembly allows a bearing assembly incorporating ring rollers of this type to be used as a pump. By reversing the rotation of the bearing assembly, the direction that the fluid will be impelled can be reversed. Due to the unique properties of the bearing assembly incorporating vaned ring roller 10, such a pump can operate at very high speed and with very low mechanical wear. If vaned ring roller 10 is configured such that a pre-load exists, the durability will be even further increased as the pump's bearing will experience much less wear under the influence of transient shocks, changes in flow rate, or during spin-up or spin-down.

Figure 4:
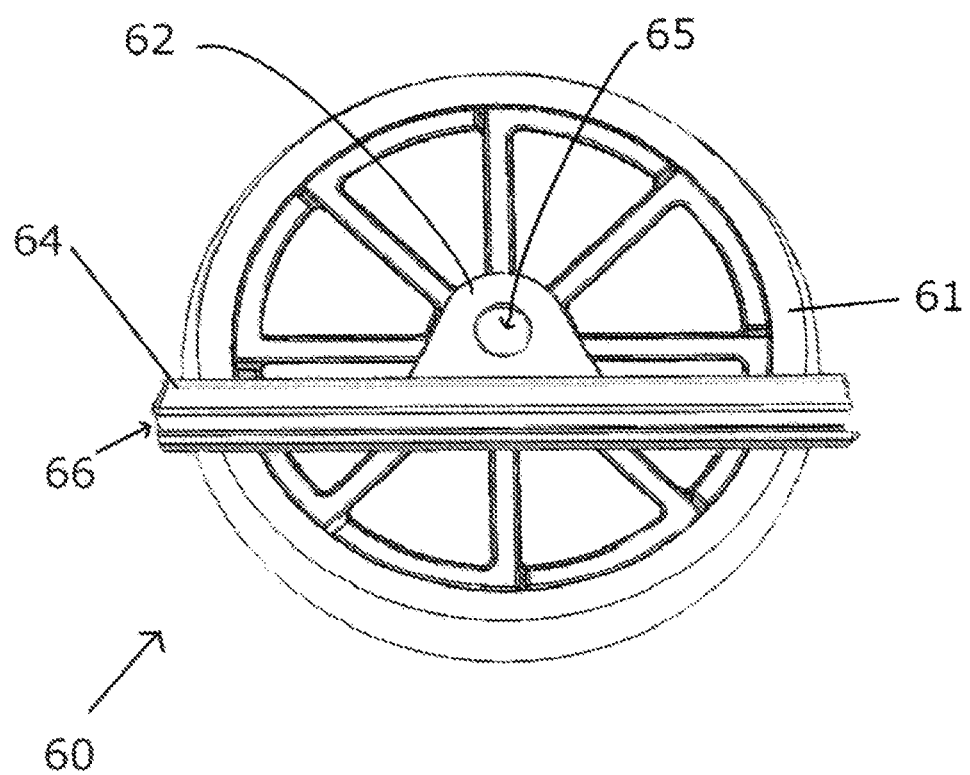
FIG. 4 depicts an overhead view of a third improved roller element.
Figure 5:
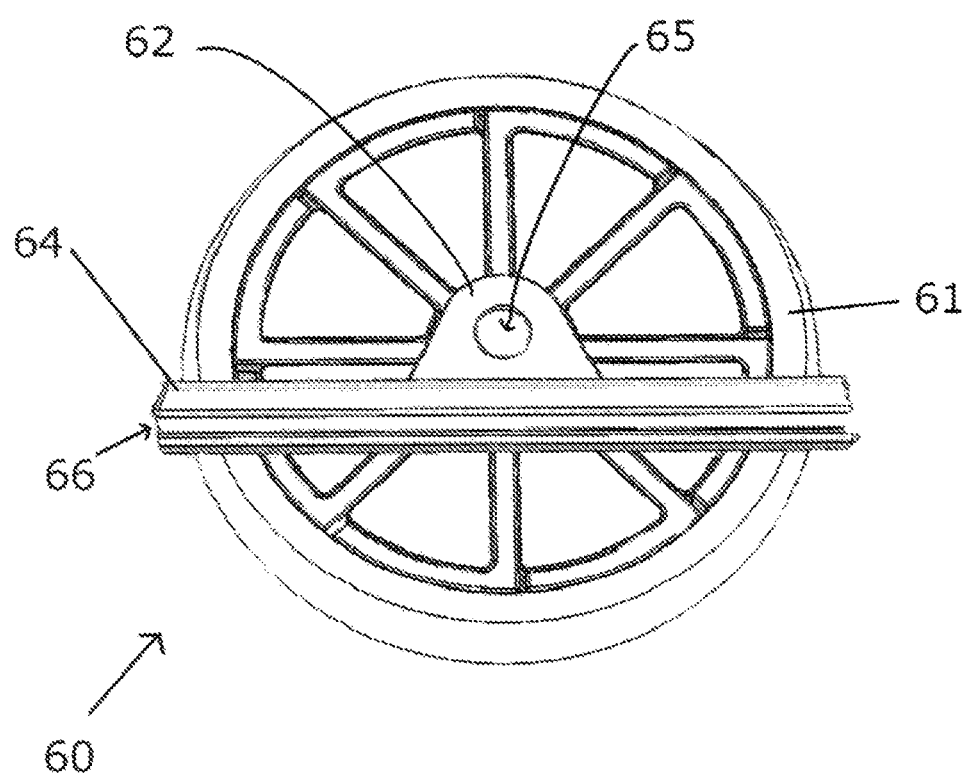

It is optional to make axial vane member 16 out of an elastomeric material to gain the advantages of using such materials described in the IBA Application. (E.g. as shown in FIG. 4 of the IBA Application, description beginning at Line 25 of Page 14 of the IBA Application.)

It is optional to include a sensor located on vaned ring roller 10 as described in the IBA Application. (E.g. as shown in FIG. 4 of the IBA Application, description beginning at Line 25 of Page 15 of the IBA Application.)

Figure 2A:
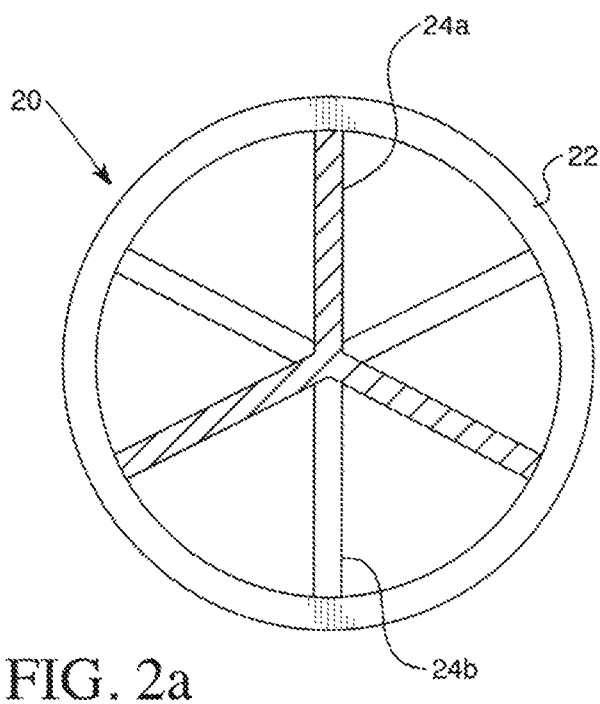
FIG. 2a depicts a side view of a second improved roller element.
Figure 2B:
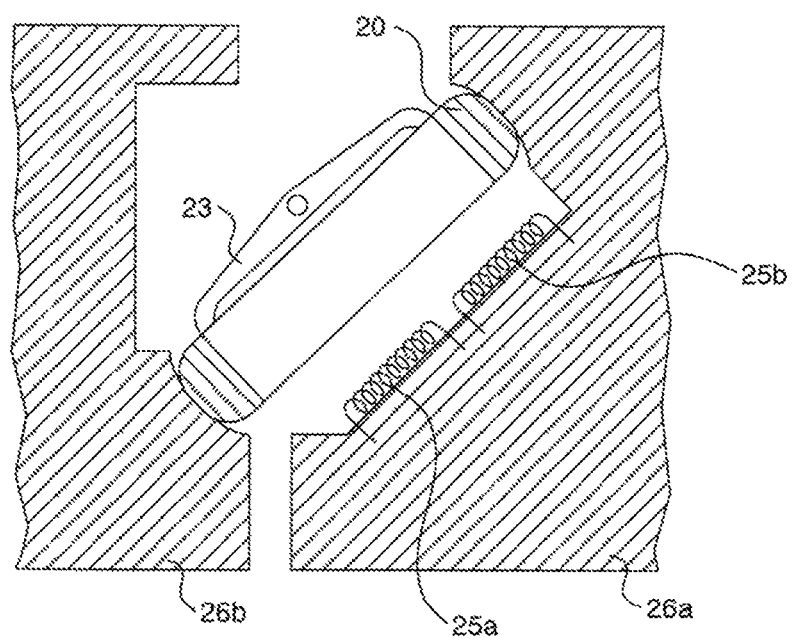
FIG. 2b depicts a cross-sectional view of a bearing assembly incorporating the second improved roller element.

FIGS. 2a and 2b show the second embodiment of the improved roller element, details of the ring rollers and the cage elements, as well as the construction of the cage. In FIG. 2a, magnetic ring roller 20 comprises ring member 22 and axial magnet assembly 24a. Axial magnet assembly 24a comprises a plurality of axial magnetic members, each of which has a north pole (depicted as solid, one such north pole indicated as north pole 24b) and a south pole (depicted with diagonal hash lines.)

FIG. 2b shows magnetic ring roller 20 in a bearing assembly comprising first raceway 26a and second raceway 26b.

Generally speaking, a 'raceway' is the groove in a roller bearing assembly in which the roller elements move or rotate, the surfaces of which they touch and keep a uniform distance apart to bear the bearing's external load. For purposes of this application, what is identified as first raceway 26a should be understood to be one of the two surfaces of the complete bearing assembly's raceway which the magnetic ring rollers touch, and second raceway 26b should be understood to be the other of the two surfaces of the bearing assembly's raceway which the magnetic ring rollers touch, the magnetic ring rollers serving to allow the two surfaces to rotate with respect to each other while keeping them a uniform distance apart to bear the bearing's external load. In the bearing assembly embodiment described herein, first raceway 26a can also be referred to as the 'inner bearing surface' and second raceway 26b can also be referred to as the 'outer bearing surface.' Depending on the configuration, either the inner bearing surface or the outer bearing surface can bear the rotating load (the load which rotates or rotates more quickly): the other bearing surface bears the static load (the load which rotates more slowly or not at all). For example, in a vehicle with an axle, the outer bearing surface would be affixed to the vehicle and bear the static load, and the inner bearing surface would be affixed to the axle and bear the rotating load. The sum of the static load and the rotating load is the external load on the bearing.

Optional cage element 23 surrounds magnetic ring roller 20 such that magnetic ring roller 20 is free to rotate, but will maintain the desired spacing with other ring rollers (not shown.) Coils 25a and 25b are connected to a source of alternating current which produces an electromagnetic field when the alternating current flows through the coils. (See FIG. 2d for an alternate embodiment description which does not require alternating current.) The electromagnetic field produces an electromotive force which acts on magnetic ring roller 20. The electromotive force repels the north poles of axial magnet assembly 24a (not shown: see FIG. 2a) and attracts the south poles likewise, which causes magnetic ring roller 20 to move in accordance with these forces. At an appropriate interval, the alternating current in the coils is reversed, which will cause a reversal of the attracting and repelling forces. Since magnetic ring roller 20 will have rotated, if the alternating current is reversed at the proper time, the combination of these attracting and repelling forces will impart more rotational force to magnetic ring roller 20 in an appropriate direction.

It is optional, but strongly preferred, to include more than one set of coils in the length of raceway 26a. (See FIG. 2d: the totality of such coils referred to hereafter as coils 25a et cetera.) It is required that all coils present in the IBA be controlled such that they contribute a net force in the desired direction of rotation of magnetic ring roller 20. This is only required if the coils are being used to actively induce rotation in magnetic ring roller 20. While only one magnetic ring roller is shown, there will be at least three ring rollers, some or all of which may be magnetic ring rollers, in any complete IBA.

It is optional to use coils 25a et cetera to provide motive force to the IBA. It is likewise optional to use coils 25a et cetera to provide braking force to the IBA. (These options are not mutually exclusive: both may be incorporated into a working embodiment of the invention.) If coils 25a et cetera are provided with alternating current such that the electromotive forces they generate tend to oppose the rotary motion of axial magnetic member 24a and thus magnetic ring roller 20, the rotation of the bearing assembly will be slowed. This applies a non-contact electrical braking force to the bearing assembly, which causes less wear and tear than a conventional frictional braking system.

A third option, which is likewise not exclusive to the other two, is to use coils 25a et cetera to recover energy from the bearing assembly if it is already in motion. As magnetic ring roller 20 rotates in the raceway, axial magnetic member 24a will induce a current in coils 25a et cetera. This current can be used to provide electrical energy to some load, such as a motor or a battery. If the motive force which is causing the bearing assembly as a whole to rotate is removed, as magnetic ring roller 20 slows due to friction it will continue to induce current until it comes to a rest. Until that happens, current will be induced which can be used or stored by a battery or other load.

It is optional, but strongly preferred, that the outer circumference of magnetic ring roller 20 be larger than the distance between the surfaces of the raceways such that magnetic ring roller 20 is under "pre-load" as that term is used in the IBA Application. (See description starting at Line 5, Page 14 of the IBA Application.)

It is optional to include a sensor located on magnetic ring roller 20 as described in the IBA Application. (E.g. as shown in FIG. 4 of the IBA Application, description beginning at Line 25 of Page 15 of the IBA Application.)

It is optional to make axial magnetic member out of, or incorporate it into, elastomeric material to gain the advantages of using such materials described in the IBA Application. (E.g. as shown in FIG. 4 of the IBA Application, description beginning at Line 25 of Page 14 of the IBA Application.)

Figure 2C:
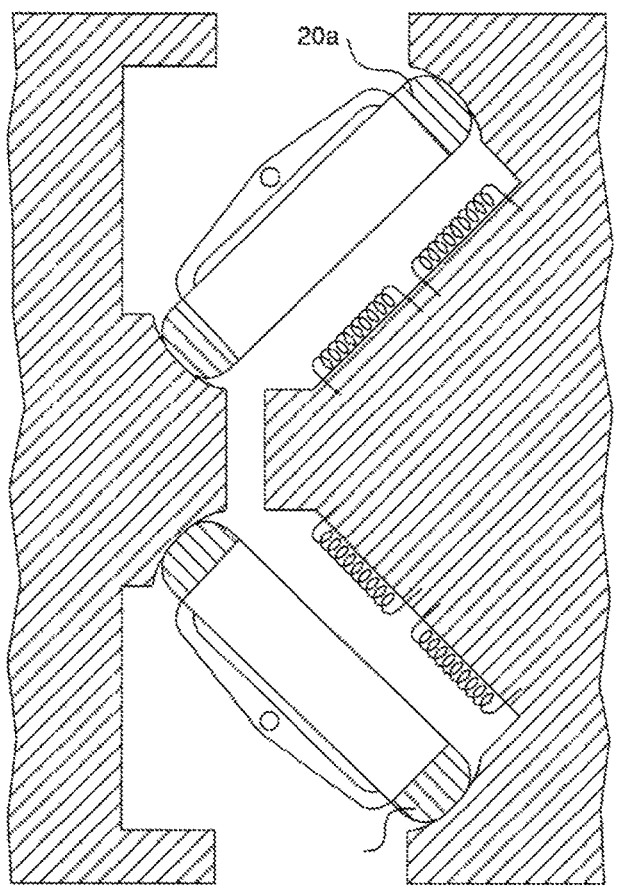
FIG. 2c depicts a cross-sectional view of an alternate embodiment of a bearing assembly incorporating the second improved roller element.
Figure 2D:
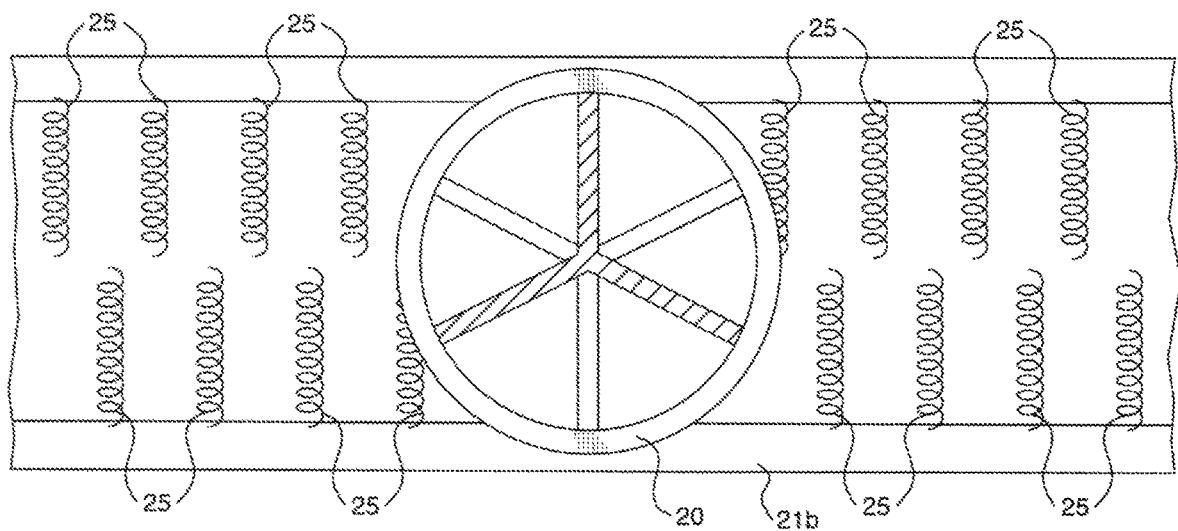
FIG. 2d depicts a cross-sectional view of another alternate embodiment of a bearing assembly incorporating the second improved roller element.

FIGS. 2c and 2d show the second embodiment of the improved roller element in two alternate bearing assemblies. FIG. 2c shows the improved roller elements in a stacked raceway bearing assembly. As with the IBA, this configuration provides the benefit of two raceways combined with the ring-type roller element. This means that, especially with pre-load, the bearing assembly will tend to maintain a constant and stable spacial orientation between the raceways. Coils similar to coils 25a et cetera (not shown, see FIG. 2d) can be incorporated in both the upper and lower raceways.

In FIG. 2d, a flattened projection of raceway 26a is shown with an alternate configuration for coils 25a et cetera, here shown simply as coils 25. In this embodiment, coils 25 are staggered alternatively. With proper selection of the distance between alternating coils, instead of an alternating current a constant direct current can be applied to coils 25 which will impart a constant net force in a selected direction of rotation of magnetic ring roller 20. As axial magnetic member 20 rotates, each coil 25 will either "pull" the nearest magnetic element of axial magnetic member 24a toward it, or "push" it away, imparting propulsive force in the desired direction of rotation. Coils 25 can either be constantly energized, or be switched on and off to provide the largest possible net force to axial magnetic member 24a. With proper configuration, coils 25 can also be used with alternating current as previously described. (See FIG. 2b.) It is required that if direct current is used, that all magnetic ring rollers used have their magnetic elements oriented so that they are all in the same or nearly the same magnetic orientation as they pass any fixed point in the raceway.

It is optional, but preferred, to have a controlling means for the flow of current through the coils, whichever embodiment is practiced, such that the controlling means can increase or decrease current flow to the coils, switch current flow to the coils on and off, and/or reverse the flow of current through the coils to produce variable acceleration (including negative acceleration) on magnetic ring roller 20. This can be as simple as a reversible AS or DC power supply, or as complex as a computer-controlled current source which can switch, increase, or decrease the current flow at any time, with or without access to sensors indicating the current position and rotational rate of the magnetic ring rollers.

It is optional, but preferred, to have a controlling means for the flow of current through the coils, whichever embodiment is practiced, such that the controlling means has a means for sensing the rotational position of axial magnetic member 24a, such that the controlling means can increase or decrease current flow to the coils, switch current flow to the coils on and off, and/or reverse the flow of current through the coils to produce the desired acceleration (including negative acceleration) on magnetic ring roller 20. This option can be mutually incorporated with the variable acceleration control means described in the previous paragraph.

It is optional, but preferred, to have a controlling means for the flow of current through the coils, whichever embodiment is practiced, such that the controlling means has a means for sensing the rotational speed of the bearing assembly, such that the controlling means can increase or decrease current flow to the coils, switch current flow to the coils on and off, and/or reverse the flow of current through the coils to produce the desired acceleration (including negative acceleration) on magnetic ring roller 20. This option can be mutually incorporated with the control means described in the previous two paragraphs.

FIG. 3 shows the cage described in the IBA Application, which can be used with the improved roller elements disclosed herein. In bearing assembly 40, ring roller 44 (which is a standard roller element in this Figure, but could comprise a vaned ring roller, a magnetic ring roller, or either in the alternate) is held captive by cage member 46, which is affixed to cord guide 47. Cord 48 goes through cord guide 47 and links all the other cage members into a flexible cage assembly. Held in the cage assembly, the ring rollers roll through raceway 42 with the desired spacing maintained.

FIG. 4 shows an alternate embodiment of the ring roller which has a cage element that does not capture the outer circumference as in the IBA Application or FIG. 3, but rather captures it by interlocking with the ring roller at the ring roller's axis of rotation. Ring roller 60 comprises outer ring 61 which is connected to a central hub (not shown) by axial members 63. Axial members 63 could comprise vanes and/or incorporate magnets as disclosed in the descriptions of FIGS. 1a and 2a. Cage element 62 interfaces with the central hub via a rotary bearing (not shown). It is required that ring roller 60 be able to rotate freely in relation to cage element 62 about rotary point 65. Cord guide 64 is affixed to cage member 62. It is preferred, but not required, that cord guide 64 and cage element 62 be extruded, molded, machined, cast or otherwise formed from a single piece of material.

It is optional, but neither preferred nor required, to include release slot 66 in cord guide 64. This allows a cord or other continuous retaining element (e.g. cord 48 shown in FIG. 3) to be passed through cord guide 64, or removed therefrom, without having to disassemble the bearing assembly. It is optional, but neither preferred nor required, to include an analogous release slot in cord guide 47 or in other embodiments of the invention or the IBA. Whether or not release slot 66 is included in cord guide 64, a cord or other retaining member (see FIG. 3) can then be passed through cord guide 64 and the cord guides of all the other cage members of the ring rollers incorporated in the bearing assembly to form a completed cage. This will cause the desired spacing to be maintained.

It is optional, but neither preferred nor required, to allow for the ends of cord guide 64 to attach only to the tangent cord guide affixed to the tangent ring rollers in the bearing assembly. If this is done, instead of a single cord, individual connections of whatever type (not shown) could connect the cage elements to form the cage and maintain the desired spacing. These attachments could be made via attachment members of any suitable type (e.g. pinch rings which pass through holes at the end of the cord guides) or by allowing the ends of cord guide 64 to mechanically interface (e.g. by terminating one end of the cord guide in a hook and the other end in a ring.) It is required that however the ends of cord guide 64 connect to other cord guides, that the connection both maintain the desired spacing and allow for unimpaired rotation of the ring rollers in the bearing assembly.

It will be apparent to those of ordinary skill in the art that the three embodiments herein could be combined in varied combination or as a single unit, granting the improvements of each to a single bearing assembly. This could be done by including improved roller elements of each of the three embodiments in a single bearing assembly, or by incorporating the elements of one embodiment into a roller element which also incorporates the elements of one or both of the other embodiments.

While various embodiments and aspects of the present invention have been described above, it should be understood that they have been presented by way of example only, and not limitation. Thus, the breadth and scope of the present invention should not be limited by any of the above exemplary embodiments.

This application—taken as a whole with the abstract, specification, and drawings being combined—provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure.

What is claimed and sought to be protected by Letters Patent is:

1. A roller element for bearings, comprising:
   a) An outer ring having an outer circumference and an inner circumference, the outer circumference contacting an inner bearing surface and an outer bearing surface of a raceway of a bearing assembly; and,
   b) An axial magnetic member, the axial magnetic member comprising a plurality of axial magnets, each of the plurality of axial magnets having a north pole and a south pole, the axial magnetic member affixed to the inner circumference.

2. A roller element for bearings as in claim 1, wherein the outer circumference when an external load is not present is greater than the distance between the inner bearing surface and the outer bearing surface when the external load is not present such that the outer ring must be compressed to be inserted into the raceway.

3. A roller element for bearings as in claim 1, wherein the axial magnetic member comprises at least two axial magnets, and wherein the at least two axial magnets are affixed to the inner circumference such that the north pole of any one of the at least two axial magnets is affixed to the inner circumference consecutively with the south pole of any other one of the at least two axial magnets along the inner circumference.

4. A roller element for bearings as in claim 3, wherein the outer circumference when an external load is not present is greater than the distance between the inner bearing surface and the outer bearing surface when the external load is not present such that the outer ring must be compressed to be inserted into the raceway.

5. A bearing assembly comprising:
   a) A raceway, comprising an inner bearing surface and an outer bearing surface;
   b) At least two roller elements, the at least two roller elements being captive inside the raceway, each roller element having an outer circumference and an inner circumference, the outer circumference coming into contact with the outer bearing surface and the inner bearing surface; and,
   c) An axial magnetic member, the axial magnetic member comprising a plurality of axial magnets, each of the plurality of axial magnets having a north pole and a south pole, the axial magnetic member affixed to the inner circumference.

6. A bearing assembly as in claim 5, further comprising:
   a) A cage, the cage comprising at least two individual cage segments, each individual cage segment comprising a cord channel and a retaining member, each retaining member retaining one of the at least two roller elements; and,
   b) A cord, the cord passing through all of the cord channels.

7. A bearing assembly as in claim 6, wherein the at least two roller elements have an external diameter, the external diameter being the distance between two diametrically opposed points on the outer circumference when an external load is not present, and the external diameter is larger than an average distance between the outer bearing surface and the inner bearing surface when the external load is not present, causing a pre-load to exist when the at least two roller elements are present between the inner bearing surface and the outer bearing surface.

8. A bearing assembly as in claim 7, further comprising:
   a) A plurality of coils incorporated into the inner bearing surface and/or the outer bearing surface, such that the plurality of coils do not physically contact the at least two roller elements; and,
   b) a power source electrically connected to the plurality of coils such that when the power source is switched on, an electrical current flows through the plurality of coils.

9. A bearing assembly as in claim 6, further comprising:
   a) A plurality of coils incorporated into the inner bearing surface and/or the outer bearing surface, such that the plurality of coils do not physically contact the at least two roller elements; and,
   b) a power source electrically connected to the plurality of coils such that when the power source is switched on, an electrical current flows through the plurality of coils.

10. A bearing assembly as in claim 5, wherein the at least two roller elements have an external diameter, the external diameter being the distance between two diametrically opposed points on the outer circumference when an external load is not present, and the external diameter is larger than an average distance between the outer bearing surface and the inner bearing surface when the external load is not present, causing a pre-load to exist when the at least two rolling elements are present between the inner bearing surface and the outer bearing surface.

11. A bearing assembly as in claim 10, further comprising:
   a) A plurality of coils incorporated into the inner bearing surface and/or the outer bearing surface, such that the plurality of coils do not physically contact the at least two roller elements; and,
   b) a power source electrically connected to the plurality of coils such that when the power source is switched on, an electrical current flows through the plurality of coils.

12. A bearing assembly as in claim 5, further comprising:
   a) A plurality of coils incorporated into the inner bearing surface and/or the outer bearing surface, such that the plurality of coils do not physically contact the at least two roller elements; and,
   b) a power source electrically connected to the plurality of coils such that when the power source is switched on, an electrical current flows through the plurality of coils.

* * * * *